Dec. 24, 1968   R. C. WHITEHEAD, JR   3,417,625
APPARATUS FOR MEASURING THE FAT CONTENT OF ANIMAL TISSUE
Filed June 9, 1966   4 Sheets-Sheet 1
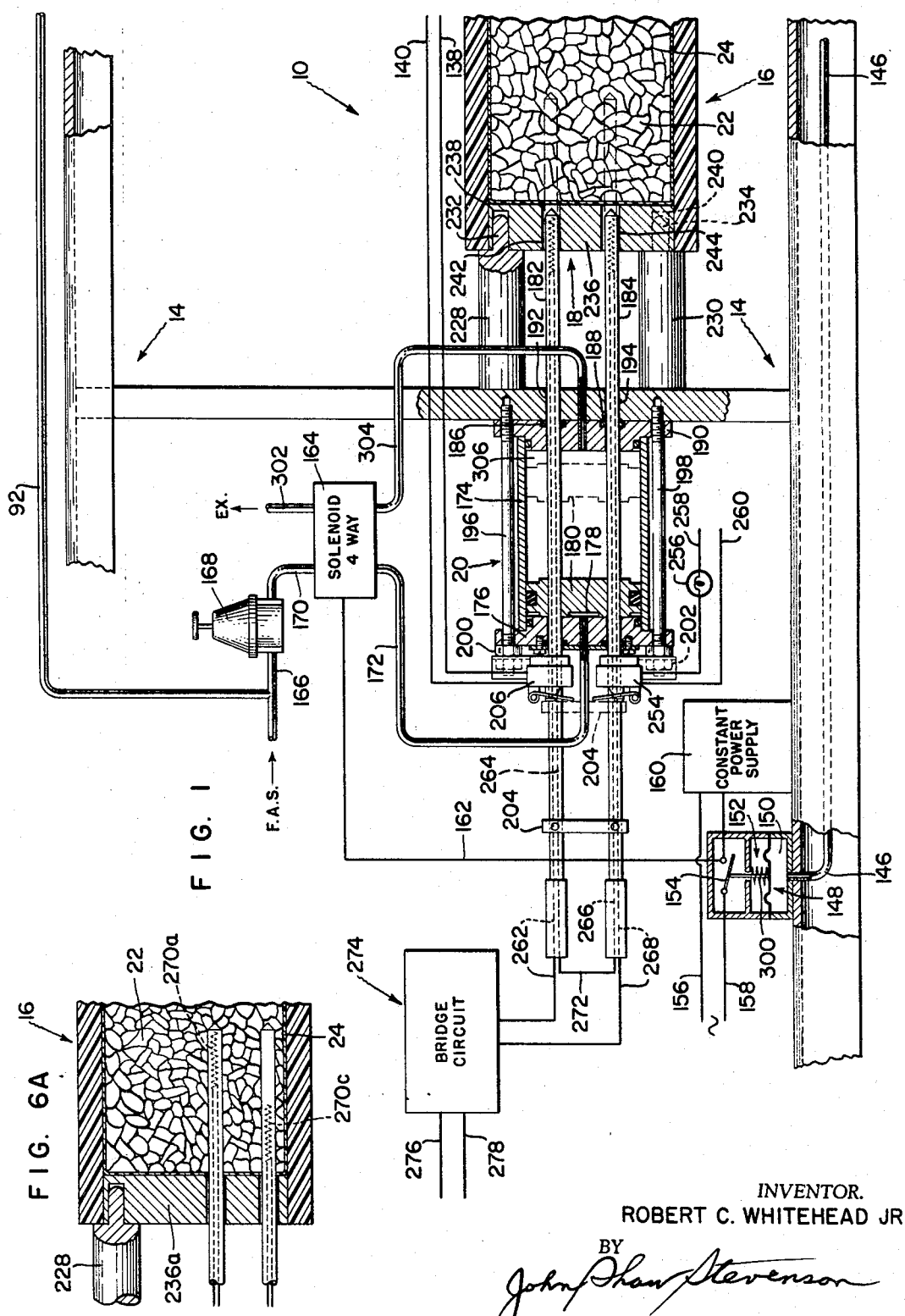
INVENTOR.
ROBERT C. WHITEHEAD JR.
BY John Shaw Stevenson
AGENT.

Dec. 24, 1968  R. C. WHITEHEAD, JR  3,417,625
APPARATUS FOR MEASURING THE FAT CONTENT OF ANIMAL TISSUE
Filed June 9, 1966  4 Sheets-Sheet 2
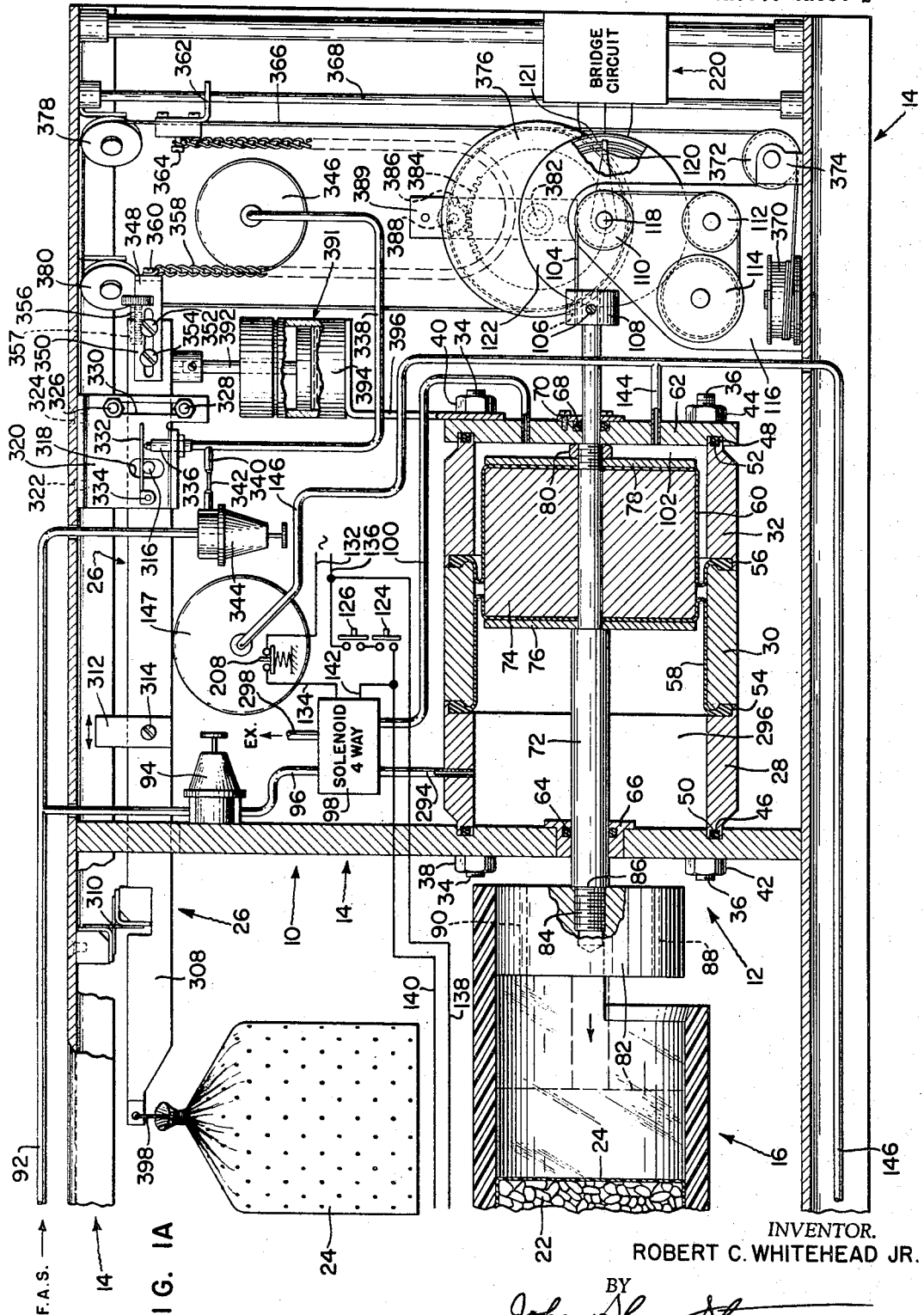
FIG. IA
INVENTOR.
ROBERT C. WHITEHEAD JR.
BY John Shan Stevenson
AGENT.

Dec. 24, 1968  R. C. WHITEHEAD, JR  3,417,625
APPARATUS FOR MEASURING THE FAT CONTENT OF ANIMAL TISSUE
Filed June 9, 1966  4 Sheets-Sheet 3
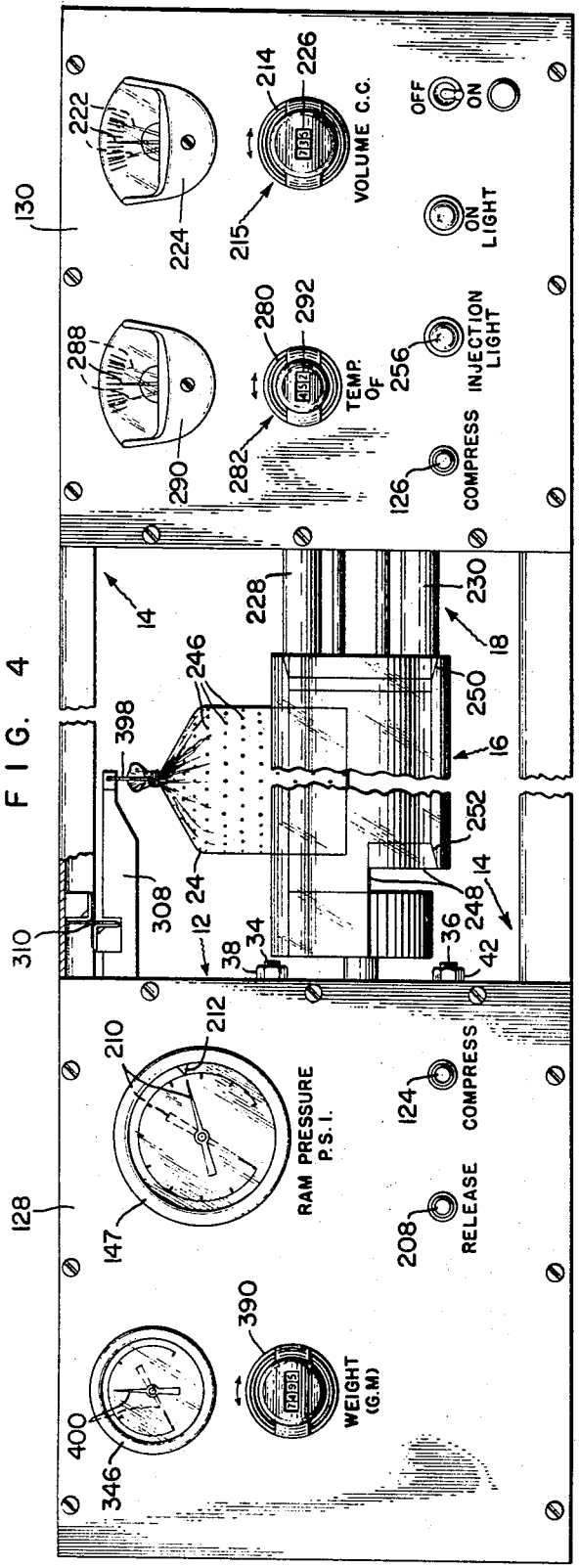
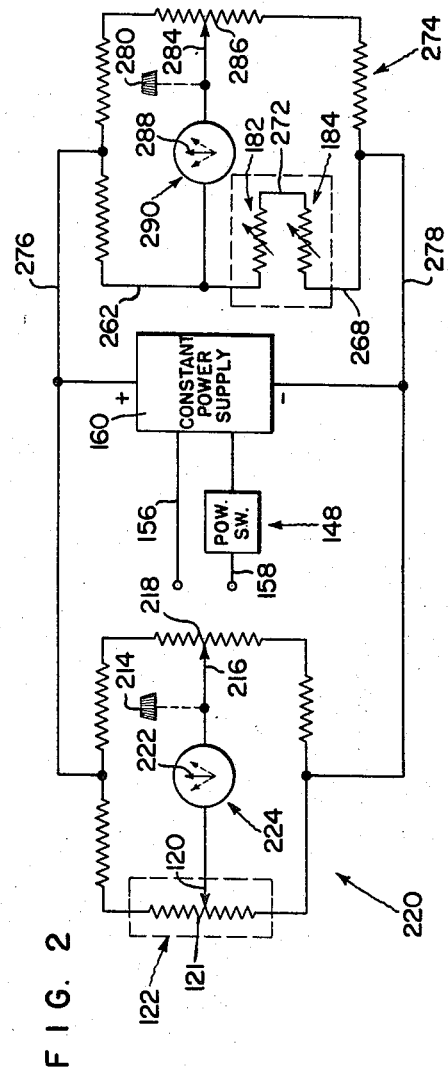
INVENTOR.
ROBERT C. WHITEHEAD JR.
BY
John Shaw Stevenson
AGENT.

Dec. 24, 1968   R. C. WHITEHEAD, JR   3,417,625
APPARATUS FOR MEASURING THE FAT CONTENT OF ANIMAL TISSUE
Filed June 9, 1966                                          4 Sheets-Sheet 4
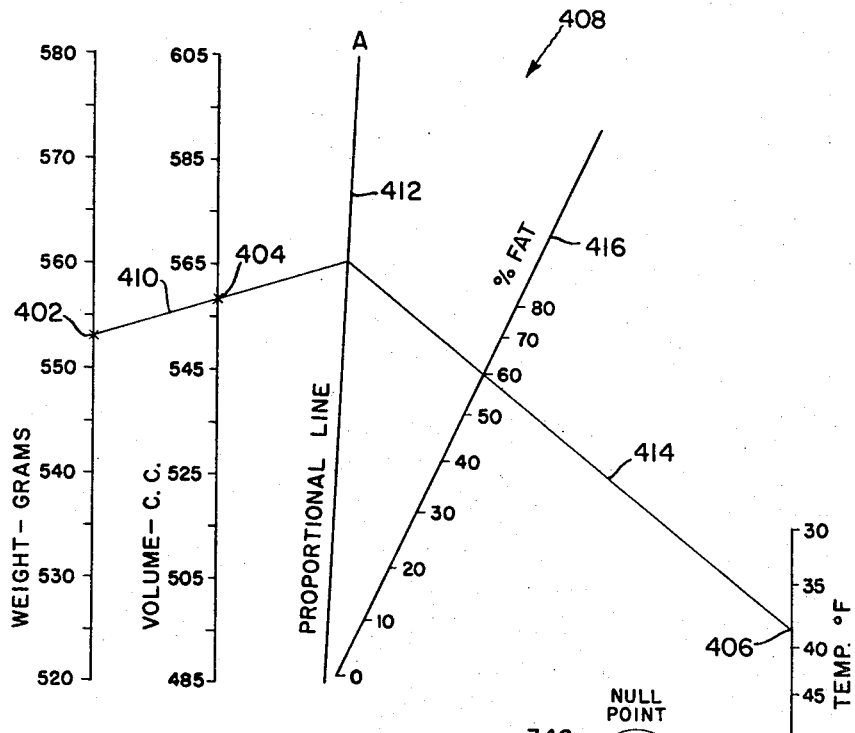
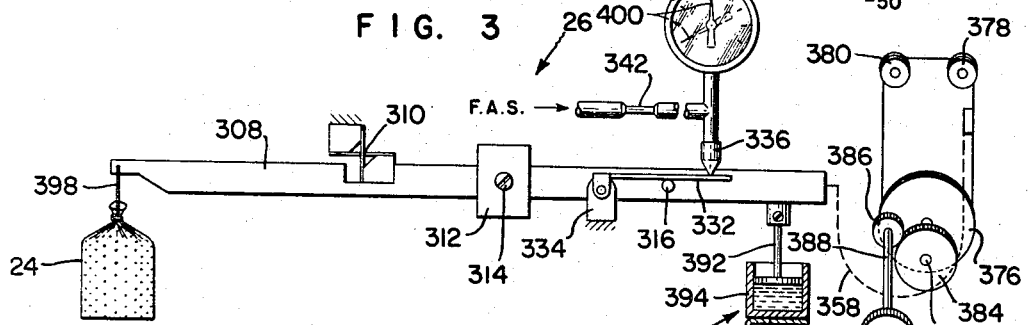
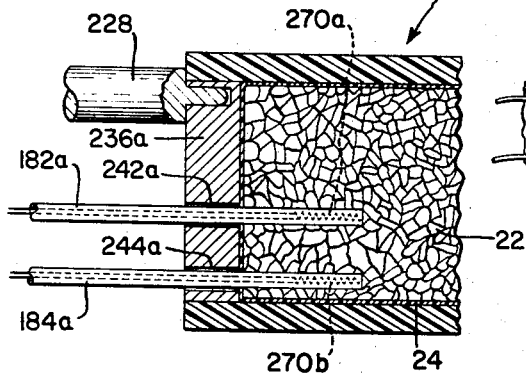
INVENTOR.
ROBERT C. WHITEHEAD JR.
BY John Shaw Stevenson
AGENT.

United States Patent Office 3,417,625
Patented Dec. 24, 1968

3,417,625
APPARATUS FOR MEASURING THE FAT
CONTENT OF ANIMAL TISSUE
Robert C. Whitehead, Jr., Oreland, Pa., assignor to
Honeywell Inc., Minneapolis, Minn., a corporation of Delaware
Filed June 9, 1966, Ser. No. 556,390
10 Claims. (Cl. 73—432)

ABSTRACT OF THE DISCLOSURE

This application discloses a semi-automatic push button operated apparatus that is useful in measuring the percent of fat in animal tissue that employs: a sleeve for retaining a porous bag of animal tissue therein; a first push button operated fluid actuated ram to compress the tissue in the sleeve so that an indicator on the ram can indicate the volume of the compressed deaerated animal tissue; a second push button operated unit to inject probes into the compressed animal tissue to take its temperature and a unit to weigh the animal tissue after it has been compressed and wherein the utilization of these values of volume, temperature and weight measurement provide a percent of fat measurement in the animal tissue.

---

It is an object of the present invention to disclose an apparatus that is useful in measuring the percent of fat in animal tissue.

It is another object of the invention to disclose an apparatus to measure the percent of fat in animal tissue that is comprised of a uniquely constructed portable sleeve, a perforated bag to retain the animal tissue within the sleeve, a push-button actuated ram to compress the tissue to a preselected compact condition against a stationary member, and means to digitally indicate in a precise manner the volume, temperature, and weight measurement of the compacted meat.

It is another object of the present invention to disclose an animal tissue supporting sleeve of the aforementioned type that is especially constructed with a grooved out end portion so that both of its ends can be simultaneously readily mounted and dismounted between a stationary cylindrical member and a piston when the piston is in a retracted position.

It is another object of the invention to provide a means of injecting temperature probes through the stationary cylindrical member and bag into the animal tissue supported by the aforementioned sleeve before the ram has fully compressed the animal tissue into a preselected compacted condition.

It is another object of the present invention to provide a plurality of injectable temperature sensing probes, preferably of electrical resistance type, having different selected elongated temperature sensing areas for injecting into the animal tissue at different radially and longitudinal displaced positions within the sleve so that the temperature sensed by each probe can be electrically combined in a digitizing circuit associated with these probes to produce a true representative measurement of the temperature of the compressed animal tissue.

It is another object of the present invention to reveal two separate null balance bridge circuits and associated manually operated digital potentionmeter units as a means for digitally indicating the volume and temperature of the compacted meat.

It is a more specific object of the invention to disclose a connection between the aforementioned push-button actuated ram and a wiper of one of the aforementioned digital potentiometers to enable the resistance introduced into its null balance bridge circuit to be adjusted in accordance with the distance that the ram is required to move to compact the animal tissue.

It is another object of the invention to disclose a means of indicating the magnitude of the weight of the animal tissue in digital form that is comprised of a weighing unit, a null balance pneumatic indicator associated with the weighing unit and a manually operated digital dial to apply a force to the weighing unit for zeroing out the pointer of the null balance indicator at a twelve o'clock position.

It is another object of the present invention to provide an electro-mechanical switching power cut-in circuit actuated by the movement of the temperature sensing probes to allow simultaneous digital potentiometric measurement of the temperature and volume of the animal tissue only after the ram has compressed the tissue into a preselected compact condition.

It is another object of the invention to provide a cylindrically expandable bag whose maximum outside diameter is less than the inside diameter of the aforementioned sleeve so that the bag can be rapidly inserted into the sleeve before the animal tissue is compacted and can be rapidly removed from the sleeve after a selected compaction of the animal tissue in the sleeve has been completed.

It has heretofore been a common practice for manufacturers of hamburg, hot dogs, canned and chopped meats, etc. to rely on the human eye to visually inspect these meat products in process in order to make sure that their fat content does not exceed a maximum allowable legal level set by state and federal laws before these products are shipped to their distribution channels.

Another batch sampling technique, e.g. the ether test for determining the percent of fat content of these meat products is available, but the long time which is required by these batch sample lab techniques to complete a percent of fat test makes them impractical for use on high speed meat processing production lines.

In view of the present day trend of more stringent enforcement of our federal and state food laws, it has become incumbent on the manufacturers of meat products to provide an on-line production apparatus to more rapidly obtain the percent of fat in their meat products in a more up-to-date accurate manner.

Such an apparatus will enable meat processors to eliminate errors due to the visual human eye inspection technique. Elimination of these errors is important as they often result in a large financial loss to the meat processor when large batches which have been shipped many miles from the plant are rejected by state and/or federal meat inspectors and the meat packer must pay the great cost of returning the rejected meat to the meat processors plant.

It is another object of the present invention to provide an apparatus that will more rapidly indicate the precent of fat in meat products than has heretofore been impossible with the time consuming ether technique and which will also provide a more accurate measurement than has heretofore been possible when the human eye is relied upon as the sensing unit to detect the precent of fat in the meat products.

It is another object of the invention to disclose a unique on-line percent of fat measuring apparatus of the aforementioned type that will:

(1) Speed up the production of a meat processing operation that presently employs time consuming laboratory instrumentation.

(2) Inspect the meat and process more accurately so that little if any financial loss will be realized by the meat processor due to rejection of their meat by local, state, or federal inspectors.

A better understanding of the present invention can be had from the following detailed description when read in connection with the accompanying drawing in which:

FIGURE 1 is a left end portion of the apparatus to measure the percent of fat in animal tissue;

FIGURE 1A is the right end portion of the apparatus shown in FIGURE 1;

FIGURE 2 is a view showing how the null balance bridge circuits and their associated digital pots are electrically connected for simultaneously indicating the volume and temperature of the compacted animal tissue;

FIGURE 3 shows another null balance circuit and a means for digitally indicating the weight of animal tissue after it has been compacted and;

FIGURE 4 shows a rear elevation view of the aforementioned apparatus shown in FIGURES 1 and 1A;

FIGURE 5 is an enlarged view of the temperature sensing probe shown in FIGURE 1;

FIGURE 6 is a preferred modified form of construction for the probes shown in FIGURE 1;

FIGURE 6A is another modified form of construction for the probes shown in FIGURES 1 and 5;

FIGURE 7 is a nomograph showing how a percent of fat determination can be determined from the values of weight, volume, and temperature obtained by the apparatus disclosed in FIGURES 1–6.

FIGURES 1 and 1A of the drawing shows the percent of fat measuring apparatus 10 as being comprised of a ram actuated volume measuring unit 12 mounted on a unitary frame member 14, a readily removable sleeve 16 inserted into a position between a frame supported stationary cylindrical unit 18 and the ram actuating unit 12; a ram actuated injectable temperature measuring probe unit 20 mounted on the frame 14 and insertable through the unit 18 and through animal tissue 22 under measurement that is retained within a bag 24 that is in turn positioned within the interior of the cylindrical member 18, and a digital weight unit 26 to provide a means of measuring the weight of the animal tissue after it has been compressed by the unit 12 to remove air pockets and entrained air therefrom.

The volume measuring unit 12 is comprised of a cylinder that is formed by joining three ring shaped portions 28, 30, 32 together by means of a suitable number of tie bolts 34, 36. These tie bolts pass through the apertures, not shown, that are positioned between the inner and outer wall surface of the plates 14, 62, and each of the opposite ends of these tie bolts contain a nut 38–44. The rings 28–32 contain annular grooves 46, 48 to accommodate the insertion of associated O-shaped resilient rings 50, 52 therein.

Pairs of annular grooved out wall portions 54, 56 are formed in the ends of the rings 28, 30 and in the ends of the rings 30, 32 that are adjacent one another to accommodate the retension of the peripheral portions of the rolling seals 58, 60 in fluid tight contact therebetween. This action is accomplished by allowing, e.g. nut 40 and 44 to be rotated to compress the end plate of the cylinder 62 into fluid tight engagement with the O-shaped ring 52 and the left end of the ring 28 to compress the O-shaped ring 50 into fluid tight engagement with the frame 14.

A first O-shaped ring 64 is mounted in fluid tight engagement with retainer ring 66 and a second O-shaped ring 68 is mounted in fluid tight engagement with another retaining ring 70 so that a fluid tight joint is formed in the left and right ends of the cylinders 28–32 through which the piston rod 72 can be reciprocated.

The ends of this cylindrical piston 74 and the ends of two plates 76, 78 are shown retained in physical engagement with the inner ends of the rolling seals 58, 60 by means of a nut 80 which is threadedly mounted on the piston rod 72.

The piston rod 72 has a ram 82 fixedly mounted on its left end by means of an end screw connection 84 and the shoulder 86 against which it is jammed. A suitable number of grooves 88, 90 are employed in the outer peripheral surface of the ram to provide a fluid exhaust passage between the inner wall of the sleeve 16 and the ram 82 when the ram is moved between its solid and dotted line positions in the sleeve 16.

A conduit 92 is connected to a suitable filtered air supply F.A.S. under pressure at one end and by way of a pressure regulator 94, a conduit 96, commercially available four way solenoid valve 98 and a conduit 100 to a piston chamber 102 formed at the right end of the ring portions 28, 30, 32.

The pressure level of the air applied to the chamber 102 will be increased to a preselected upper maximum pressure level which is determined by adjusting the position of the pressure regulator 94 to a preselected position.

As the pressure in the chamber 102 is increased the rolling seals 58, 60 piston block 74, the piston rod 72, and the ram 82 will be moved to the left to compress the animal tissue 22 that is retained within the bag 24 that is shown located in the sleeve 16.

While the increase in the level of the pressure of the air occurs, a cable 104 which is shown having one end fixedly connected by way of a screw and block connecting means 106, 108 will also be moved to the left.

The remaining portion of the cable 104 is shown passing several times over the grooved drum 110 and centrally fixed thereto then over the pulley 112 and spring loaded drum 114 that are all mounted for rotation on the support plate 116 that in turn is fixedly connected to the frame 14.

The spring loaded drum 114 thus maintains tension on the cable 104 and thereby applies a spring force between the shaft 118 and the connecting means 106, 108 to eliminate any lost motion therein.

The outer end of a shaft 118 is shown supporting the drum 110 thereon and the inner end of the shaft is shown having a wiper 120 mounted for rotation therewith along the slidewire 121 of a potentiometer 122, as shown in FIGURES 1A and 2.

FIGURE 1A and FIGURE 4 show that the ram actuated volume measuring unit 12 is further comprised of two spaced apart thumb operated push-button switches 124, 126 that are located on panels 128, 130. When jointly pushed in these switches 124, 126 connect the four way solenoid valve 98 to an A.C. source of power by way of the conductors 132–142.

To operate the volume measuring unit 12 the thumbs of the right and left hand must be moved apart and into compressed engagement with both of the switches 124, 126 so that there is no possibility of the hands of the operator being dangerously positioned between the sleeve 16 and the ram 82 when the ram is energized for movement.

Depression of the switches 124, 126 energizes the four way solenoid valve 98 to a position that will allow a regulated air under pressure to be supplied from the fluid air supply F.A.S. by way of conduit 92, regulator 94, conduits 96, 100 to the chamber 102. The pressure of the fluid in chamber 102 is also applied by way of conduits 144, 146 to a ram pressure indicating gauge 147. The other end portion of the conduit 146 is connected to a pressure switch 148.

The pressure switch 148 is schematically shown as having a fluid pressure chamber 150, a spring loaded diaphragm 152, and a switch blade 154 mechanically connected for movement to a closed position immediately before the fluid pressure in the chamber 102 and 150 reaches the desired preselected set point pressure level to which the regulator 94 has been set.

When the switch blade 154 is closed, current will flow from an A.C. power source by way of conductors 156, 158 and a commercially availably constant output voltage supply unit 160 and conductor 162 to a second four way solenoid valve 164 to energize the valve to an open position. When the solenoid valve 164 has been placed in this open position the filtered air supply F.A.S. under pressure will be allowed to flow from a F.A.S. source, the conduit 166, a set point pressure regulator 168, conduit 170, solenoid valve 164, conduit 172 into the left end of the O-ring sealed cylinder 174 and between the right side of its fluid tight left end 176 and the recessed wall 178 on the left end of the movable piston 180. When this occurs the piston 180 and the temperature sensing probe 182, 184 attached thereto will be moved to the right as a single unit to their dotted line positions.

It can thus be seen from FIGURE 1 that during the injection of the temperature sensing probes they will be moved through fluid tight sealed-off aperture wall portions 186, 188 in a cylindrical plate 190 that forms a right end of the cylinder 174. These probes 182, 184 are also moved through apertures 192, 194 formed in an upright portion of the frame 14. This frame 14 in turn supports the cylinder 174, the end plates 176 and 190 by means of a suitable number of tie bolts 196, 198 and a nut 200 and 202 associated with each of these tie bolts.

When the probes have been inserted through the bag 24 into the animal tissue 22, as noted above, a switch actuating member 204 that is fixedly connected to the probes 182, 184 will be moved from its solid line position to its dotted line position as shown in FIGURE 1.

When the switch actuating member 204 reaches its dotted line position it will then close the minature switch 206 that is shown mounted on the left end of the tie bolt 196 as shown in FIGURE 1.

When this switch 206 is closed the push-buttons shown in FIGURE 1A and FIGURE 4 can then be released without interrupting the current being supplied from the A.C. source to the four way solenoid 98. This is possible because in FIGURES 1 and 1A it can be seen that the closing of the switch 206 will allow current to be applied by way of the closed release switch 208, conductor 134, conductors 132, 138, switch 206 and conductors 140, 142 to the four way solenoid valve 98.

While this switching action occurs the pointer 210 of the ram pressure gauge 147 shown on FIGURE 4 will continue to be moved automatically upscale in a clockwise direction toward a selected set point pressure indicating mark 212.

When the pointer 210 reaches the set point mark 212 on gauge 148 it will bring the operators attention to the fact that the desired pressure is then being applied to the ram 82 to compress the animal tissue 22 that will have allowed all of the air in the cavities and entrained air in the animal tissue to be forced out to atmospheric pressure. This is done by way of perforations in the bag 24 and through the grooves 88, 90 formed in the outer peripheral surface of the ram 82.

When the animal tissue has reached the aforementioned compressed state the next step that the operator performs is to take a digital null balance measurement of the volume of this compressed animal tissue. This is done as shown in FIGURES 2 and 4 by rotating the knob 214 of the digtal indicator 215 in a direction that will move the wiper 216 along a slide-wire 218 until the remaining leg portions of bridge circuit 220 causes the indicator pointer 222 of the null balance indicator to be moved from either dotted line position to its twelve o'clock balanced null position as shown in solid line form in FIGURE 4. When the indicator 224 has been placed in the twelve o'clock position a true digital reading of the volume of the animal tissue in the sleeve can then be obtained from the digital indicating portion 226 of the digital indicator 215.

*Sleeve construction*

FIGURE 1 shows a suitable number of cylindrical shaped supports 228, 230 fixedly connected to the frame 14 at one end and having each of their other ends 232, 234 of a substantially dowel pin configuration. A removable disc 236 is shown having apertures 238, 240 therein for slideable mounting in the assembled position shown in FIGURE 1 on the dowel pins 232, 234. The disc 236 also has a pair of apertures 242, 244 therein to accommodate the movement of the probes 182, 184 from their retracted solid line position to their injected line position through unit 18.

When the percent of fat measurement of the animal tissue is to be made, a sample of this animal tissue is dropped into a bag 24 containing a series of perforated apertures 246. The bag 24 and the animal tissue 22 contained therein is then inserted into the sleeve 16 as shown in FIG. 1A.

The slotted out wall portion 248, of the sleeve 16 is placed over the extreme left end of the ram 12 and its left end is then slid to the right over the stationary disc 236 to the position shown in FIGURE 4. It should be noted that the inside surfaces 250, 252 of the sleeve 16 are chamfered to facilitate the insertion of the sleeve on the disc 236 and the ejection of the ram from the sleeve.

*Injectable temperature measuring probe unit*

When the probes 182, 184 and the switch actuating member 204 have been moved from their solid line into their dotted line positions the member 204 will then be retaining the miniature switch 254 in a closed position and the temperature probe's injection light 256 located on the panel 130 in the A.C. power supply line 258, 260 will be lit.

After taking a digital reading of the volume of the compressed animal tissue in cubic centimeters on the digital indicator 215 the next measurement that is taken is the temperature of the animal tissue after the temperature probe injection light 256 has been turned on.

This measurement is taken by means of a resistance thermometer circuit that is comprised of two conductors 262, 264 that form leads that extend internally through the entire length of the probe 182, and conductor leads 266, 268 that similarly extend through the entire length of the probe 184. Each pair of conductor leads 262, 264; 266, 268 have a fine wire temperature sensing resistance coil 270 formed in the manner shown in FIGURE 5 adjacent the tip of the probe 182 and are connected in series by the conductor portion 272 as shown in FIGURES 1 and 2.

The conductor leads 262, 268 are connected as shown in FIGURES 1 and 2 to a bridge circuit 274 that in turn is connected by way of the electrical conductors 276, 278 to a suitable constant voltage D.C. power supply source.

A preferred substitute form for the aforementioned probes is identified as reference numerals 182a and 184a in FIGURE 6 of the drawing. It will be noted that with the FIGURE 6 arrangement the temperature of the animal tissue is sensed by the fine wire sensing coils 270a, 270b, shown in FIGURE 6 which may be similar to the coil 270 shown in FIGURE 5.

The advantage of injecting the probes 182a, 184a, through differently located aperture wall portions 242a, 244a in the disc 236a than those shown in disc 236 shown in FIGURE 1 is to enable one to take a better average temperature measurement by sensing the temperature of an internal portion of the animal tissue 22 that is located adjacent the center of the sleeve 16 and at a portion of animal tissue 22 that is located adjacent the inner surface of the cylindrical walls of the sleeve 16.

The fine coil sensing elements 270a, 270b, may also be positioned at different distances to the right of the disc 236a as shown in FIGURE 6A rather than at the same distance as shown in FIGURES 1 and 5 if desired in order to obtain an averaging out of the temperature of the animal tissue not only in two different radial locations within the sleeve 16 but also in two different logitudinal portions within the sleeve 16.

When any pair of the aforementioned animal tissue temperature sensing probes, e.g. 182, 184 are moved to their dotted injected line positions as shown in FIGURE 1 and the injection light 256 is lit this will be a signal to the operator that the probes are then in a desired position to take a temperature measurement of the animal tissue 22.

The temperature measurement is done as shown in FIGURES 2 and 4 by rotating the knob 280 of the digital indicator 282 in a direction that will move the wiper 284 along a slidewire 286 until the remaining leg portions of the resistance thermometer bridge circuit 274 causes the indicator pointer 288 of the null balance indicator 290 to be moved from either of its dotted line positions to its twelve o'clock balanced position as shown in solid line form in FIGURES 2 and 4.

When the indicator 290 has been placed in a twelve o'clock position a true digital reading of the temperature of the animal tissue 22 in the sleeve 16 can then be obtained from the digital indicating portion 292 of the digital indicator 282.

When the temperature of the animal tissue has been obtained from the digital indicator 282 the release button 208 shown in FIGURES 1A and 4 is pushed in to de-energize the four way solenoid valve 98. This action will cause the four way solenoid valve 98 to be moved to a position that will allow air under a regulated pressure to be introduced by way of a conduit 294 into the chamber 296 while the air under pressure in chamber 102, conduit 146, and pressure switch chamber 150 is vented to atmosphere through conduits 160, 298.

As the pressure in chamber 150 continues to drop as it is being exhausted to atmospheric pressure the diaphragm unit 152 will be forced by its spring 300 to move the switch blade 154 to a solid line position that will disconnect the power supply from the four way solenoid valve 164. When this de-energization of the four way solenoid valve 164 occurs the pressure in the cylinder 174 between its left end wall 176 and the dotted line portion of the piston 180 will be exhausted to atmosphere by way of conduit 172, solenoid valve 164, and conduit 302. While this action takes place air under pressure applied by way of the filtered air supply F.A.S. regulator 168, solenoid valve 164, and conduit 304 will be applied to the chamber 306 formed between the piston 180 and the end plate 190 to move the piston to the left back to its solid line position.

*Digital weight unit*

As shown in FIGURES 1, 3, and 4 the digital weight unit 26 is comprised of a beam 308 which is made of a solid bar construction. The beam 308 is mounted to rock in a see saw fashion about a cross-spring pivot 310 which in turn has a portion thereof fixedly connected to the frame 14.

A counter weight 312 is constructed to slide along the beam 308 and to be retained in place thereon by means of a set screw 314.

The beam 308 has a pin 316 fixed thereto which protrudes outwardly and normal to one of its sides and through a wall 318 that forms a slot in a bracket 320 that in turn is fixed to the frame 14 by rivets 322, 324.

A pair of adjustable stops 326, 328 are employed for slidable adjustment in the wall 330 forming a second slot in the bracket 320 to restrict the degree of motion through which the beam can travel as it is moved about its pivot 310.

A spring biased flapper 332 is also mounted on the bracket 320 by means of a pivot 334 to retain it against the nozzle 336. This nozzle is connected by way of one end portion of conduit 338, the conduit 340, restriction 342, pressure regulator 344, and conduit 92 to a filtered air supply F.A.S. The other end of the conduit 338 is connected to a pressure gauge 346.

The right end of the beam shown in FIGURE 1A has an angle shaped bracket 348 having a slotted wall portion 350 protruding therefrom. A pair of adjustable screw members 352, 354 are shown passing through the slotted wall 350 which are threadedly mounted on one side of the beam 308. A span adjusting member 356 is shown threadedly connected for movement into and out of a threaded aperture 357 formed in the right end of the beam 308 and the head of the screw member 356 is shown rotatably mounted in a rectangular shaped slot formed in the bracket 348.

Rotation of the head of the screw 356 will enable the end of a chain 358 connected to the end of the bracket 348 by screw member 360 to be moved closer to or further away from the end of the beam 308.

The other end of the chain 358 is shown fixedly connected by means of bracket and screw connection 362, 364 to a wire 366 for slidable engagement with the guide rail 368.

One end of the wire 366 is connected to and wrapped about a spring loaded drum 370. The portion of the wire extending away from the drum 370 is shown passing over a first pulley 372 that is supported for rotation by bracket 374 on frame 14. The wire 366 is then shown wrapped about one end of a second drum 376 and then in an upward direction over the pulleys 378, 380 and directed in a downward direction about the other end of the drum 376 to which its end is attached. The drum 376 is fixedly mounted for rotation with a shaft 382 to which a bull gear 384 is attached.

The bull gear 384 in turn is in mesh with a pinion 386 that is mounted on a manually rotatable shaft 388. This shaft is supported on a bearing plate unit 389 that is mounted on the back of the panel plate 128. The digital indicator knob 390 is fixed at the end of the shaft 388 for rotating the pulley 376 by way of the shaft 388.

A dash pot 391 shown in FIGURE 1A and FIGURE 3 having a piston 392 connected as shown for movement with the beam 308 and a pot portion 394 mounted as shown in FIGURE 1A on a support bracket 396.

When the ram 82 has been retracted after compressing the animal tissue 22 in a sleeve 16 and the temperature probes 182, 184 have been retracted, the sleeve 16 and the animal tissue 22 contained therein is then moved away from its location between the volume measuring unit 12 and the injectable temperature measuring probe unit 20.

The perforated bag 24 of the animal tissue 22 is then removed from the sleeve 16 and hung by a suitable connecting link 398 on the left end of the beam 308 as shown in FIGURES 1A and 3. The digital indicator knob 390 is then adjusted to transmit rotary motion by way of the shaft 388, pinion 386, bull gear 384, shaft 382, and drum 376 to, e.g. the lower end portion of the wire that is attached by screw 364 thereto in a downward direction toward the drum 376. This rotation will thereby add a greater weight of the chain 358 to the right end of the beam to balance the weight of the bag of animal tissue 22 placed thereon. As this knob adjustment is being made the pointer 400 of the gauge 346 will be moved from its dotted line position to its twelve o'clock solid line position.

When the pointer 400 is in this twelve o'clock solid line position, weight indicator 390 will have then been rotated to a position to indicate the weight of the deaerated animal tissue 22 and the bag 24.

When the volume, temperature, and weight measurements are obtained in the aforementioned manner the operator then marks these values in the form of an X on the weight, volume, and temperature scales 402, 404, 406 of the nomograph 408 shown in FIGURE 7.

A first line 410 is then drawn with the aid of a straight edge, such as a ruler through the X marks on the weight and volume scales, 402, 404 and this line is extended past the proportional line 412.

A second line 414 is then drawn between the mark on the temperature scale 406 through the point on the proportional line 412 where it is intersected by the first line 410.

The operator can then read the true value of the percent of fat in the animal tissue under measurement by observing what point on the percent of fat scale 416 is intersected by the second line 414.

From the aforementioned description it can be seen that a unique apparatus has been developed which will more rapidly indicate the percent of fat in meat products that has heretofore been impossible with the time consuming ether technique and which will also provide a more accurate measurement than has heretofore been possible when the human eye is relied upon as the sensing unit to detect the percent of fat in the meat products.

What is claimed is:

1. A volume, temperature and weight correlating apparatus useful in measuring the percent of fat in animal tissue, comprising a first ram actuator, a stationary cylindrical member, a readily removable sleeve insertable into a supported position on and between the stationary cylindrical member and the ram actuator, a removable porous bag filled with the animal tissue under measurement positioned within the sleeve, the first ram actuator being operable to move a ram associated therewith to compress the bag and animal tissue in the sleeve against the cylindrical member and deaerate the animal tissue, a volume measuring unit operably connected for movement with the actuator, an injectable temperature measuring unit having a portion thereof positioned by means of a second ram actuator for insertion through the bag and the animal tissue contained therein, a temperature measuring circuit portion associated with the unit to indicate the temperature of the animal tissue, and a weight measuring unit positioned adjacent the temperature measuring unit is employed to measure the weight of the animal tissue after it has been compressed by the ram of the first ram actuator and wherein the utilization of said values of the volume, temperature and weight measurements provide a percentage of fat measurement in the animal tissue.

2. The apparatus as defined in claim 1 wherein an aperture is formed by a wall portion of the ram of the first ram actuator extending into the inner wall of the sleeve to emit air from the animal tissue while it is being compressed.

3. The apparatus as defined in claim 1 wherein the injectable temperature unit is comprised of a plurality of probes positioned by the second ram actuator for insertion through the stationary cylindrical member.

4. The apparatus as defined in claim 1 wherein the injectable temperature measuring unit is comprised of probes provided with temperature sensing elements that are positioned at different radial spaced apart positions of the animal tissue in the sleeve.

5. The apparatus as defined in claim 1 wherein the injectable temperature measuring unit is comprised of probes provided with temperature sensing elements that are positioned at different radial spaced apart positions of the animal tissue in the sleeve and at different longitudinal distances from the end of the sleeve.

6. The apparatus as defined in claim 1 wherein a cylindrical side wall portion of the sleeve contains an open slot in one end thereof, the bag is flexible, of a smaller diameter than the sleeve and contains perforations therein to deaerate the animal tissue while it is being compressed by the ram of the first actuator, the flexibility inherent in the bag being operable to provide rapid insertion and withdrawal of the animal tissue contained therein into and from a position within the inner wall of the sleeve, the portions of the temperature measuring unit actuated by the second actuator being positioned within an aperture in the cylindrical member for movement by the second actuator into the compressed animal tissue, the volume measuring unit being comprised of a first null balance digital indicator connected for movement with the ram to indicate the magnitude of the compressed volume of the animal tissue in the sleeve, the temperature measuring circuit portion being comprised of a second null balance digital indicator operably connected with the insertable portion to indicate the magnitude of the temperature of the animal tissue within the sleeve, said weight measuring unit comprising a digital null balance means having a pivot member, a beam mounted for movement about the pivot member, connecting means to attach the bag of deaerated animal tissue to one end of the beam, and a manually adjusted digital weight balancing indicator connected to the other end of the beam to indicate the weight of the animal tissue when the beam is brought into a balanced position by the manual adjustment of the last mentioned indicator.

7. The apparatus as defined in claim 1 wherein a cylindrical side wall portion of the sleeve contains an open slot in one end thereof, the bag is flexible, and contains perforations therein to provide deaeration when the animal tissue is compressed, the flexibility inherent in said bag being operable to provide rapid insertion and withdrawal of the animal tissue contained therein into and from a position within the inner wall of the sleeve, the portions of the temperature measuring unit actuated by the second actuator being positioned within an aperture in the cylindrical member for movement by the second actuator into the compressed animal tissue, the volume measuring unit being comprised of a first null balance digital indicator connected for movement with the ram to indicate the magnitude of the compressed volume of the animal tissue in the sleeve, the temperature measuring circuit portion being comprised of a second null balance digital indicator operably connected with the insertable portion to indicate the magnitude of the temperature of the animal tissue within the sleeve, the insertable portion being comprised of at least two temperature sensing elements electrically connected in series as one leg of an electrical bridge, said weight measuring unit comprising a digital null balance unit having a pivot member, a beam mounted for movement about the pivot member and positioned adjacent the temperature measuring unit, connecting means to attach the bag of deaerated animal tissue to one end of the beam, and a manually adjusted digital weight balancing indicator connected to the other end of the beam to indicate the weight of the animal tissue when the beam is brought into a balanced position by the manual adjustment of the last mentioned indicator.

8. The apparatus as defined in claim 1 wherein the insertable portion is comprised of temperature sensing means electrically connected in series with one leg of a temperature measure electrical bridge circuit, a normally opened first switch operably connected to provide electrical power to the bridge and power to inject the injectable portion of the second ram actuator when closed, the switch being operably connected for closing by the volume measuring unit before the animal tissue in the sleeve is in its deaerated condition and thereby affect a simultaneous injection of the insertable portion in the animal tissue and a temperature measurement of the animal tissue by the bridge circuit.

9. The apparatus as defined in claim 1 wherein the insertable portion is comprised of temperature sensing means electrically connected in series with one leg of a temperature measuring electrical bridge circuit, a normally open first switch operably connected to provide electrical power to the bridge and power to inject the injectable portion of the second ram actuator when closed, the switch being further operably connected for closing by the volume measuring unit before the animal tissue in the sleeve is in its deaerated condition and thereby affect a simultaneous injection of the insertable portion in the animal tissue and a temperature measurement of the animal tissue by the bridge circuit, and wherein a pair of manually operated spaced apart normally open power supply switches are employed to form a first manually operated portion of a ram actuated control circuit, said last mentioned circuit being operably connected to a valve to apply power to move the ram of the first ram actuator and thereby compress the animal tissue in the sleeve when the pair of switches are manually held in a closed position, a switch actuating member mounted for movement with an outer non-temperature sensing end of the insertable portion of the temperature measuring unit and into contact with another power supply switch forming an associated automatically operated part of the ram actuator control circuit to maintain continued application of power to move the ram of the first ram actuator when the insertable portion of the temperature sensing means has been injected into the animal tissue and the pair of switches are manually released to their open switch positions.

10. The apparatus as defined in claim 1 wherein the insertable portion is comprised of temperature sensing means electrically connected in series with one leg of a temperature measuring electrical bridge circuit, a normally open first switch operably connected to provide electrical power to the bridge and power to inject the injectable portion of the second ram actuator when closed, the switch being further operably connected for closing by the volume measuring unit before the animal tissue in the sleeve is in its deaerated condition and thereby affect a simultaneous injection of the insertable portion in the animal tissue and a temperature measurement of the animal tissue by the bridge circuit, and wherein a pair of manually operated spaced apart normally opened power supply switches are employed to form a first manually operated portion of a ram actuated control circuit, said last mentioned circuit being operably connected to a valve to apply power to move the ram of the first ram actuator and thereby compress the animal tissue in the sleeve when the pair of switches are manually held in a closed position, a switch actuating member mounted for movement with an outer non-temperature sensing end of the insertable portion of the temperature measuring unit and into contact with another power supply switch forming an associated automatically operated part of the ram actuator control circuit to maintain the application of power to move the ram of the first ram actuator when the insertable portion of the temperature sensing means has been injected into the animal tissue and the pair of switches are manually released to their open switch positions, and wherein a manually operated normally closed release switch forms a portion of the ram actuated control circuit and is operably connected to the valve associated with the last mentioned circuit to thereby return the first ram actuator to a non-compressed position with respect to the animal tissue in the sleeve and to simultaneously effect an ejection of the injected portion of the second ram actuator when said release switch is manually opened.

References Cited

UNITED STATES PATENTS 3,282,115   11/1966   Taylor et al. _____ 73—432

S. CLEMENT SWISHER, *Acting Primary Examiner.*

JOSEPH W. ROSKOS, *Assistant Examiner.*